No. 674,786. Patented May 21, 1901.
H. W. MENGE.
PLOW.
(Application filed Mar. 14, 1901.)
(No Model.) 2 Sheets—Sheet 1.
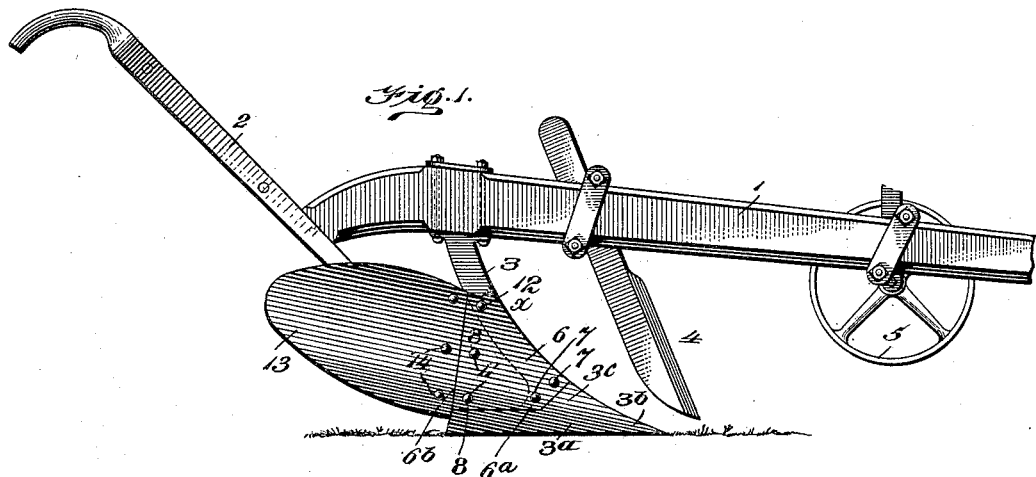
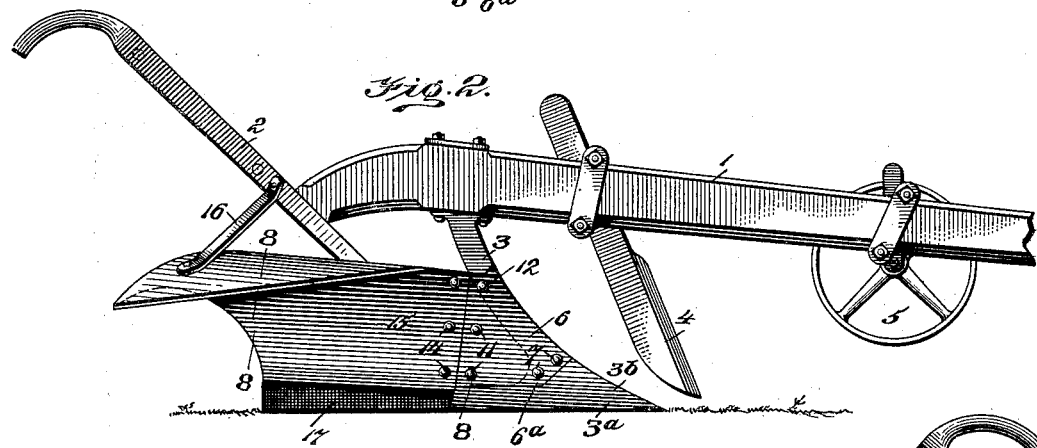
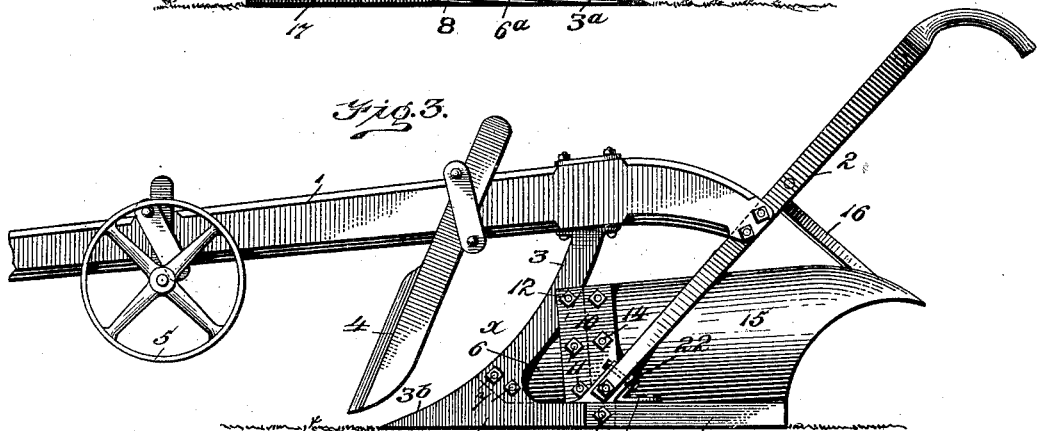
WITNESSES:
H. G. Dieterich
Guy Worthington
INVENTOR
H. W. Menge
BY
Fred G. Dieterich & Co.
ATTORNEYS No. 674,786. Patented May 21, 1901.
H. W. MENGE.
PLOW.
(Application filed Mar. 14, 1901.)
(No Model.) 2 Sheets—Sheet 2.
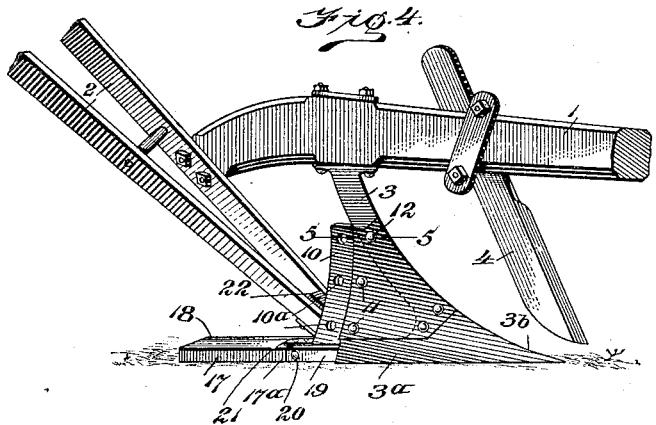
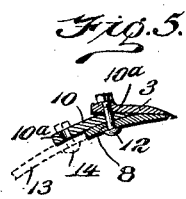
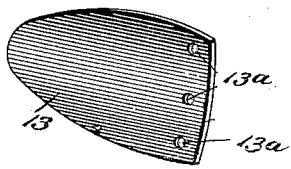
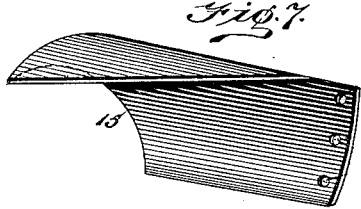
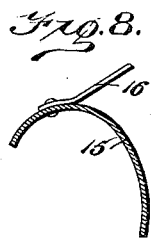
WITNESSES: INVENTOR
H. W. Menge
BY
ATTORNEYS

UNITED STATES PATENT OFFICE.

HENRY WILLIAM MENGE, OF NEAR HAPPY JACK, LOUISIANA.

PLOW.

SPECIFICATION forming part of Letters Patent No. 674,786, dated May 21, 1901.

Application filed March 14, 1901. Serial No. 51,169. (No model.)

*To all whom it may concern:*

Be it known that I, HENRY WILLIAM MENGE, residing near Happy Jack, Plaquemines parish, and State of Louisiana, have invented certain new and useful Improvements in Plows, of which the following is a specification.

This invention seeks to provide a simple and economical means in the nature of an attachment for the ordinary type of highland-plow, whereby the same can be readily arranged for use as a lowland-plow, and particularly adapted for use in lowlands where special types of lowland-plows are needed and in such boggy places where it is impossible for a draft-animal to travel.

My invention comprehends, in connection with the ordinary construction of plow-beam and standard, a peculiar and novel arrangement of clamping-plate for detachably joining interchangeable low or high land moldboards and a special landside member adapted to coöperate with the regular landside member and form an extension thereof.

In its more subordinate features this invention consists in certain details of construction and combination of parts, all of which will hereinafter be fully explained, and particularly pointed out in the appended claims, reference being had to the accompanying drawings, in which—

Figure 1 is a view of my improved form of plow, the same being shown arranged to operate as an ordinary highland-plow. Fig. 2 is a similar view from the moldboard side, showing the same arranged as a lowland-plow. Fig. 3 is a view of the latter form of plow as seen from the landside. Fig. 4 is a detail perspective view of the plow with the moldboard removed and the landside extension attached. Fig. 5 is a cross-section on the line 5 5 of Fig. 4 with moldboard attached. Fig. 6 is a detail view of the detachable or regular highland-moldboard. Fig. 7 is a similar view of the lowland-moldboard; and Fig. 8 is a cross-section of the lowland-board, taken, practically, on the line 8 8 of Fig. 2.

Referring to the accompanying drawings, in which like numerals indicate like parts in all the figures, 1 designates the beam, 2 the handles, and 3 the standard, having the usual landside member $3^a$ and share or point $3^b$.

4 designates the colter, and 5 the beam-guide roller, the several parts designated being of any well-known highland-plow construction, as the said parts in their general correlation form, *per se*, no part of my invention.

In my construction at the juncture of the curved or front member $x$ of the standard and the landside member said standard has a fillet $3^c$, which forms a solid bearing upon which the lower end $6^a$ of the detachable moldboard-section 6 is fitted and to which it is made fast by the two bolts 7 7, that pass through it and the fillet $3^c$. The rear end of the member 6 in the present construction terminates in a straight vertical edge $6^b$, and said edge has three (more or less) bolt-apertures 8 8, the purpose of which will presently appear, and the upper end of said member 6 is bolted to the vertical part $6^b$, as clearly shown in Fig. 5.

10 designates a metal plate, which has two vertical rows of apertures $10^a$ and which is curved in a plane with the curvature of the rear edge of the member 6. This plate is bolted to the member 6 by the bolts 11, that pass through the two lower apertures in the member 6 and the corresponding apertures $10^a$ in plate 10, and by the bolt 12, that passes through the upper apertures in the members 6 and 10 and through the part $6^b$ of the standard, as shown in Fig. 5.

13 designates the common form of highland-moldboard, the front edge of which has a set of apertures $13^a$ and is curved in a plane with the rear edge of the member 6. When the plow is to be used as an ordinary highland-plow, the board 13 is made fast by the bolts 14, that pass through the apertures $13^a$ and the outer set of apertures $10^a$ in the plate 10. In this form the plow has the usual short landside-section 19.

When used for low and boggy lands, the moldboard 13 is removed and a turnover or lowland moldboard 15 is used, the rear end of which terminates in a substantially semicircular shape that gradually diminishes toward the forward end and merges with the curvature of rear end of member 6, and the said board 15 is braced at its outer end to the handles by the strap-bar 16, as clearly shown in Fig. 2.

When the lowland or turnover moldboard 15 is used, a supplemental landside-section is provided, which consists of the wooden beam member 17 and the metal sheathing 18. The member 17 is joined with the short section 19 to form a rigid extension thereof, and for such purpose its front end 17ᵃ laps the rear end of the section 19 and is made fast by one of the bolts 20, that secures the sheathing 18, and said member 17 is further braced by the detachable angle-plate 21, made fast to the front end of the member 17, and the rear face of the stub 22, that forms a part of the section 19 and to which the lower ends of the handles are secured.

From the foregoing description, taken in connection with the accompanying drawings, it is thought the manner in which the several parts constituting my complete invention may be interchangeably and advantageously used will be readily apparent.

By means of my improvements an ordinary plow-stock can be changed in a few minutes to provide for cultivating highlands or boggy lowlands.

By providing a detachable curved or turnover moldboard of the character described and illustrated the plow with the extensible landside can be worked (in surfaces where an animal cannot walk) by being drawn with rope or pulley operated by the draft-animal on the headland. It will effectively turn down prairie grass or weeds of great height and leave the plowed ground in such condition as not to show grass or weeds. When the plow is made up new, the plow batten or plate 10 is preferably cast integral with the member 6.

Having thus described my invention, what I claim, and desire to secure by Letters Patent, is—

1. An improved plow, comprising in combination with the standard, the share and the landside member 19; the moldboard member 6, detachably secured to the standard, an apertured member 10, projected from the rear edge of the member 6, and curved in a plane with said member 6; of a plurality of moldboards having different curvatures, and means for detachably securing said boards to the apertured member 10, substantially as shown and for the purposes described.

2. The combination with the standard, and the member 6, detachably secured to the standard, said member 6, having a straight rear edge, and a series of bolt-apertures, adjacent said edge; of the interchangeable moldboards, each having its front edge constructed to abut the rear edge of the member 6, and form a continuation of said member 6, said front moldboard edges having bolt-apertures, the apertured plate 10, and means for joining said plate 10 and the moldboards to the member 6, substantially as shown and for the purposes described.

3. The hereinbefore - described improvements in plows, comprising in combination, with the standard, the landside-section 19, the share and the detachable section 6, the plate 10, adapted to be detachably secured to the rear edge of the member 6, and having the curvature of said rear edge, said plate having a series of apertures 10ᵃ, at the rear edge, the extensible landside-section 17, having its front end arranged to lap the rear end of the section 19, the sheathing, means for detachably securing the extensible section 17 to the member 19, said means comprising the bolt 20, and the angle-plate 21; and the moldboards 13 and 15, adapted to be interchangeably connected to the plate 10, the front ends of said boards 13 and 15, being curved on the plane of the rear edge of the section 6, means for joining the said boards 13 and 15 to the member 6, all being arranged substantially as shown and for the purposes described.

HENRY WILLIAM MENGE.

Witnesses:
NICOLAS DOLESE,
G. V. GROLEAN.